(12) United States Patent
Altenmueller et al.

(10) Patent No.: US 11,163,059 B2
(45) Date of Patent: Nov. 2, 2021

(54) SYSTEM AND METHOD FOR RADAR BASED MAPPING FOR AUTONOMOUS ROBOTIC DEVICES

(71) Applicants: BSH Home Appliances Corporation, Irvine, CA (US); BSH Hausgeräte GmbH, Munich (DE)

(72) Inventors: Laurenz Altenmueller, Munich (DE); Philip Roan, San Mateo, CA (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 477 days.

(21) Appl. No.: 16/137,591

(22) Filed: Sep. 21, 2018

(65) Prior Publication Data
US 2019/0094352 A1 Mar. 28, 2019

Related U.S. Application Data

(60) Provisional application No. 62/561,700, filed on Sep. 22, 2017.

(51) Int. Cl.
| | |
|---|---|
| *G01S 13/89* | (2006.01) |
| *G01S 7/35* | (2006.01) |
| *G01S 13/88* | (2006.01) |
| *G01S 13/60* | (2006.01) |
| *G01S 13/42* | (2006.01) |
| *G01S 13/86* | (2006.01) |

(52) U.S. Cl.
CPC .............. *G01S 13/89* (2013.01); *G01S 7/352* (2013.01); *G01S 13/42* (2013.01); *G01S 13/60* (2013.01); *G01S 13/881* (2013.01); *A47L 2201/04* (2013.01); *G01S 13/86* (2013.01); *G01S 13/867* (2013.01)

(58) Field of Classification Search
None
See application file for complete search history.

(56) References Cited

U.S. PATENT DOCUMENTS

| | | | | |
|---|---|---|---|---|
| 2012/0293359 | A1* | 11/2012 | Fukuda | G01S 13/64 342/107 |
| 2016/0161609 | A1* | 6/2016 | Tanaka | G01S 13/60 342/71 |
| 2018/0304468 | A1* | 10/2018 | Holz | G06T 7/13 |

OTHER PUBLICATIONS

M. Adams, J. Mullane and B. Vo, "Circumventing the Feature Association Problem in SLAM," in IEEE Intelligent Transportation Systems Magazine, vol. 5, No. 3, pp. 40-58, Fall 2013, doi: 10.1109/MITS.2013.2260596. (Year: 2013).*
DE19910715A1 translation (Year: 1991).*
DE102015209101A1 translation (Year: 2015).*

* cited by examiner

*Primary Examiner* — Whitney Moore
(74) *Attorney, Agent, or Firm* — Michael E. Tschupp; Andre Pallapies; Brandon G. Braun

(57) ABSTRACT

Data from a radar sensor moving through a static environment may be smoothed and used to generate range profiles by approximating peaks. A direction of arrival (DOA) can then be determined based on the range profile in order to generate a reprojection map. The reprojection map is used to provide updates to a stored map in a robot.

20 Claims, 9 Drawing Sheets

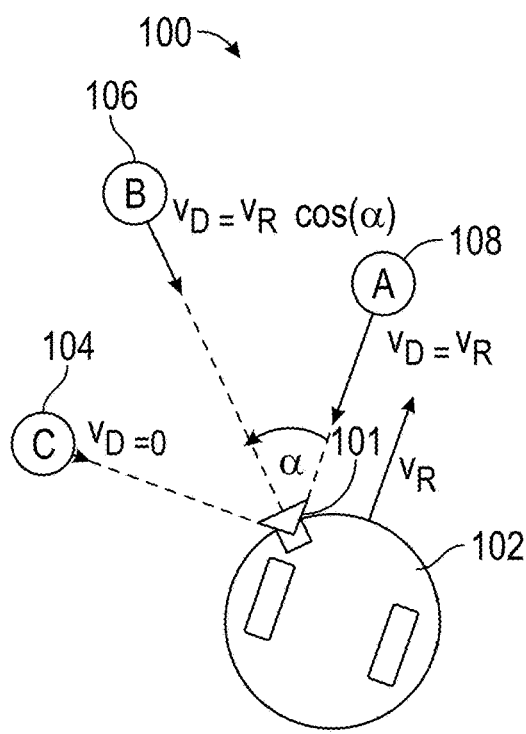
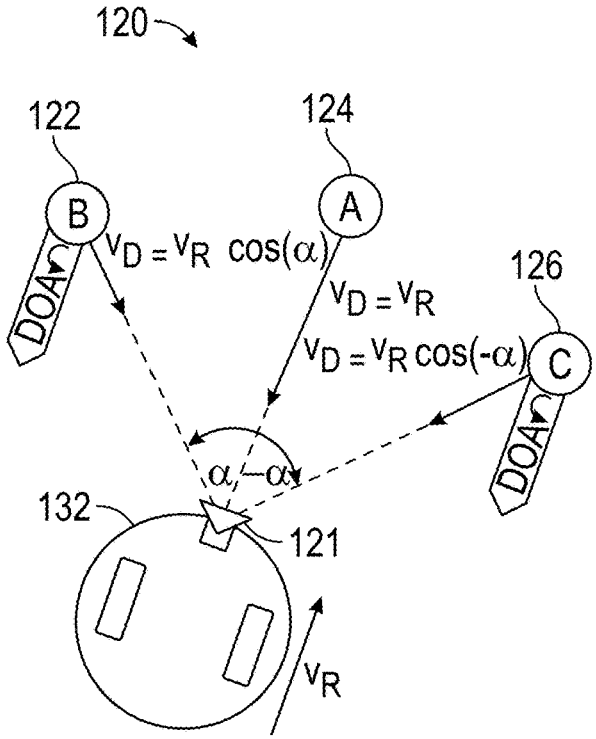
FIG. 1A          FIG. 1B
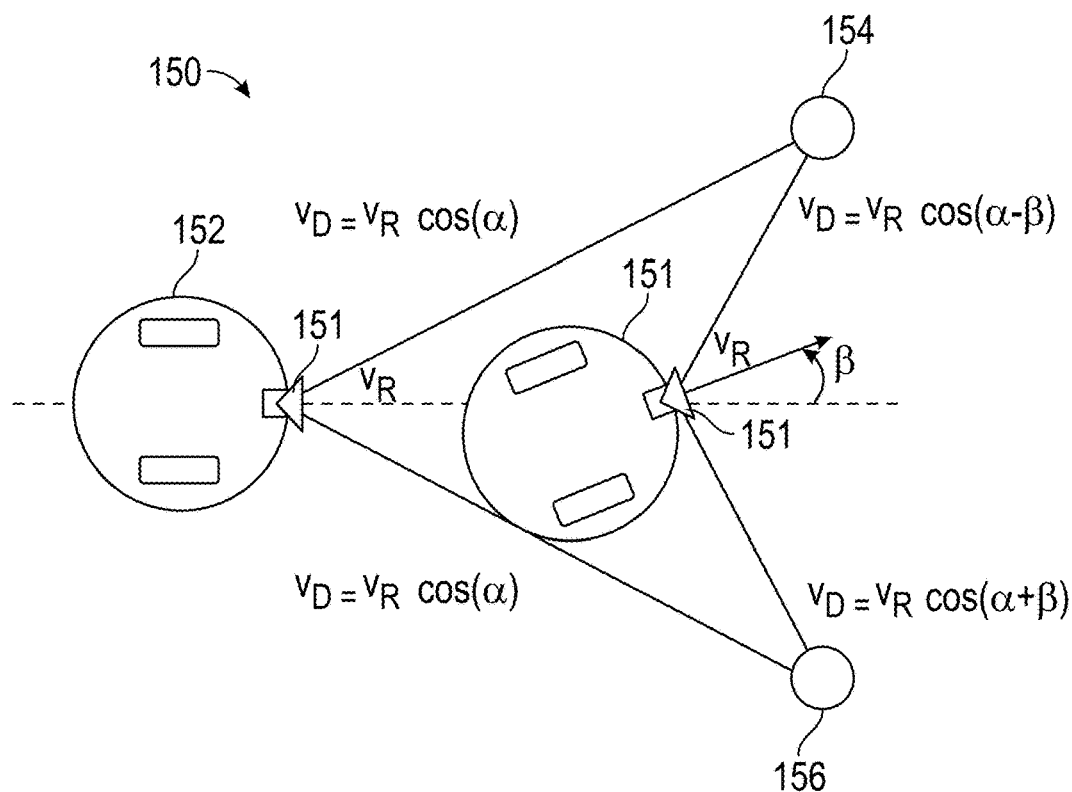
FIG. 1C

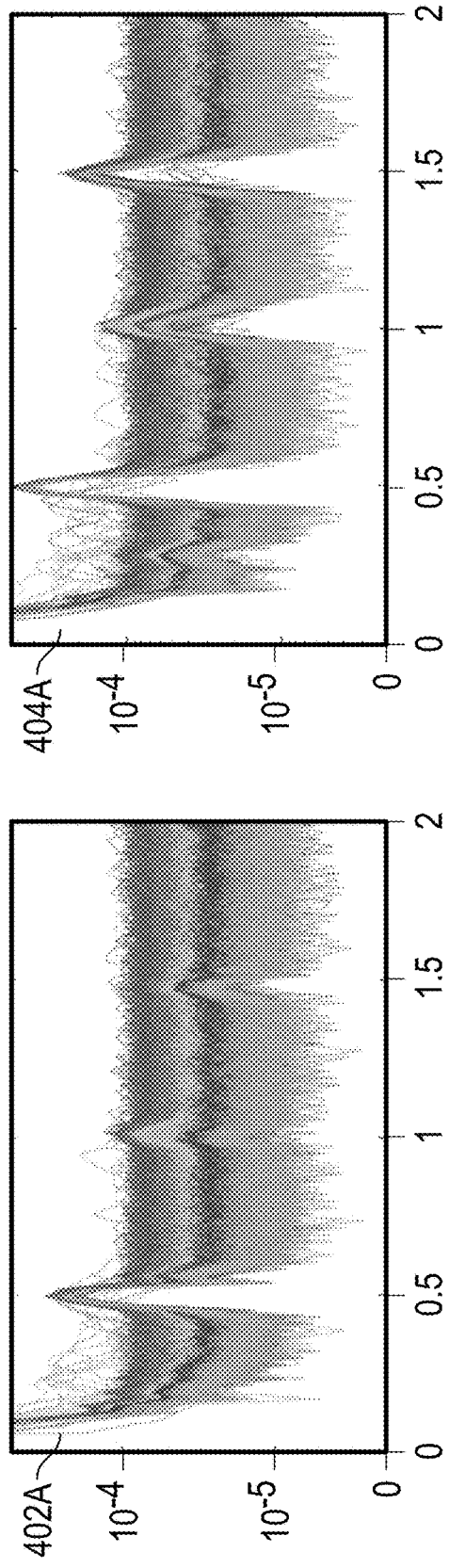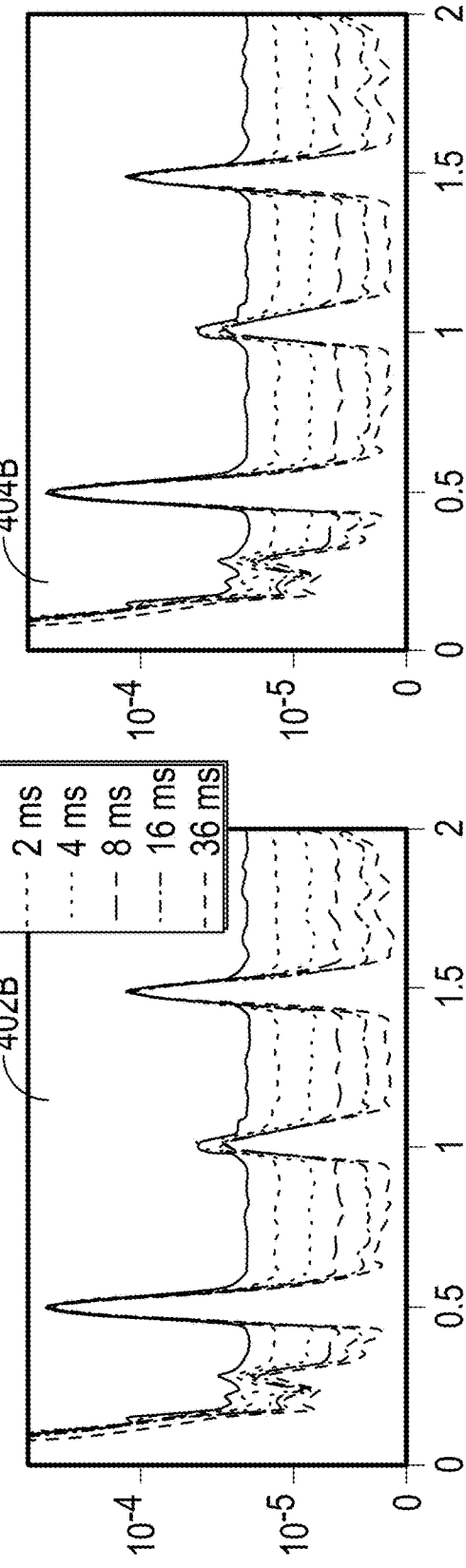

US 11,163,059 B2

SYSTEM AND METHOD FOR RADAR BASED MAPPING FOR AUTONOMOUS ROBOTIC DEVICES

CROSS-REFERENCES

This patent application is related to and claims priority under 35 U.S.C. § 119(e) from U.S. Provisional Application No. 62/561,700, filed Sep. 22, 2017 entitled "RADAR REPROJECTION MAPPING IMPROVES OBSTACLE AVOIDANCE IN MOBILE ROBOTS WITH AN UNSTEERED RADAR SENSOR," the entire contents of which is incorporated herein by reference for all purposes.

TECHNICAL FIELD

The present invention relates to Radio Distance and Ranging ("radar") based mapping of an environment. In particular, the present invention relates to radar reprojection techniques for mapping a surrounding environment.

BACKGROUND

Lidar and vision sensors are often used to remotely detect obstacles in the path of, for example, mobile indoor robots. However, lidar and vision sensors typically have trouble detecting common real-world obstacles such as transparent or reflective surfaces, narrow chair legs, and the like.

BRIEF DESCRIPTION OF THE DRAWINGS

FIGS. 1A, 1B, and 1C depict an example operating environment for calculating a direction of arrival, according to various embodiments of the subject technology;

FIGS. 4A, 4B, 4C, and 4D depict range profiles generated with and without a horn extension, according to various embodiments of the subject technology;

DETAILED DESCRIPTION

Figure 2:
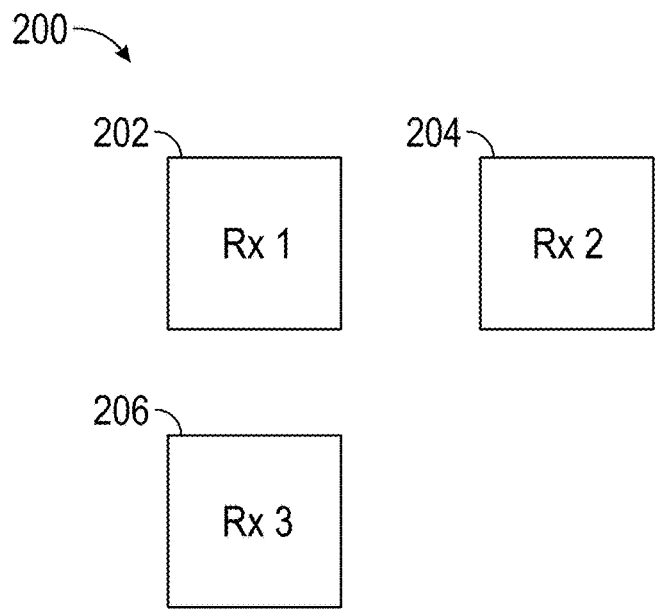
FIG. 2 illustrates a schematic view of a non-collinear receiver array, according to various embodiments of the subject technology.

Aspects of the present disclosure involve systems and methods for mapping a surrounding environment of, for example, a mobile indoor robot (e.g., autonomous vacuum, etc.) using radar reprojection techniques. Further, by using the systems and methods below, a target can be mapped in relation to a detecting radar position.

Various techniques can be used for mapping environments such as synthetic aperture radar (SAR) and the like. However, said techniques may generally require passing mapped objects on a particular side, and are thus unable to map objects ahead or behind a respective received. Further, said techniques may require fairly large or elaborate receiver arrays.

In other examples, simultaneous localization and mapping (SLAM) techniques may be used. However, SLAM techniques typically use laser and/or vision sensors (e.g., VSLAM). However, radar may be used either instead or in addition to typical SLAM techniques.

Radar provides relatively wide beam width and deeper penetration than, for example, laser or vision techniques. While all three types of sensors are based on electromagnetic (EM) waves, each has different wavelength properties. Generally speaking, resolving power of a wave is related to the wavelength of the wave. For example, lasers, which are typically of the infrared spectrum, may have a wavelength of around 900 nm, and visible light (e.g., as used by vision techniques) typically range from 400 nm to 700 nm. In comparison, a radar sensor operating at, for example and without imputing limitation, 60 GHz will utilize waves having a wavelength of 5 mm.

While a radar range reading may reveal a distance to a detected target but may not immediately indicate at what angle the target has been detected. In order to build or update a map of a detected environment, however, the target angle must be determined. In one embodiment, an angle of detection for a radar target can be extracted from range readings according to, for example, a reprojection method as discussed in the disclosure below. Generally, a radar sensor can move at a known speed through the detected environment. As the sensor moves through the detected environment, and a distance between the sensor and a particular object changes, a deviation in a measured Doppler effect (e.g., Doppler speed) from a known sensor movement speed may be determined. This deviation can then be used to calculate a magnitude of an angle between the sensor movement vector and a line-of-sight to the detected target.

In one example, a radar sensor may be sensitive only to co-planar targets (e.g., where the sensor includes antennas featuring a fan-shaped beam pattern with high sensitivity around zero elevation). Further, the antenna may be sensitive to targets only on one side of a path of motion described by the sensor. To address this, a phase difference between each of the different antenna signals received as respective echoes can be calculated. While algorithms such as MUSIC and ESPRIT may be used to determine DOA, a low accuracy θ in conjunction with a sgn(θ) can instead be used to rapidly calculate a DOA. However, these require active phased and/or mechanical scanning radar sensors.

Target Doppler speeds can be measured using, for example, frequency modulated continuous wave (FMCW) radar. In addition, FMCW radar can simultaneously register target range as well as Doppler speed. In some examples, such as at low speeds where speed resolution or accuracy may not be very high, Doppler speed can be estimated from a change in a detected range of a target over time using a peak gradient analysis.

As discussed herein, a reprojection methodology can be used to determine a radar target's source without using a mechanical scanning sensor and the like. In effect, the sensor may move at a known speed through an otherwise static environment in order to produce a Doppler effect for the visible scene. A target's measured Doppler speed's deviation from the known speed of the sensor can be used to identify a magnitude of an angle between the movement vector of the known speed (of the sensor) and the line-of-sight to the target. Once the radar target source has been determined, the information can be used to avoid obstacles, generate a map, and/or update a stored map (e.g. for regular navigation through a scene).

As soon as a range and angle are known for a target, it can be mapped in relation to the sensing radar position. Translation and rotation relative to a start position for the radar sensor can be tracked for multiple sequential measurements via, for example, proprioceptive sensors such as inertial measurement units (IMUs) and encoder odometry. In some examples, corrections from absolute position sources (e.g., magnetometer heading corrections, global navigation satellite system (GNSS) sensors such as GPS, motion capture camera systems, etc.) can be integrated in order to compensate for odometry drift and the like.

Building and/or updating of the map at a detected target location can be in the form of a binary target indicator or with a probabilistic distribution taken from a target peak in a range profile provided by a radar sensor. In some examples, the produced or updated map can then be further processed by path planning methods (e.g., Dijkstra, A*, D*, probabilistic road maps (PRM), rapidly-exploring random trees (RRT), etc.) in order to allow intelligent path planning and obstacle avoidance.

FIG. 1A depicts a scene 100 with a robot 102 with a radar sensor 101 moving at a speed $v_R$. Three targets 104, 106, and 108 are detected. In particular, targets 104 and 108 are edge cases. In other words, robot 102 is moving directly toward target 108 and just passing target 104 at a point of closest approach. As a result, a Doppler speed for target 108, where $\alpha=0$ (e.g., angle of approach is 0), can be calculated by equation 1 below.

$$v_D = v_R, \text{ for } \alpha = 0 \quad (1)$$

At the same time, an angle of approach for target 104, being at the point of closest approach (e.g., where the angle of approach $$\alpha = \frac{\pi}{2}),$$

can be calculated by equation 2 below.

$$v_D = 0, \text{ for } \alpha = \frac{\pi}{2} \quad (2)$$

Target 106, however, shows a relation of $v_D$, $v_R$, and a for targets on one side of the path of radar sensor 101, including extremes in equations 1 and 2, as seen in equation 3 below.

$$v_D = v_D \cos(\alpha), \text{ for } 0 \le \alpha \le \pi \quad (3)$$

Equation 3 above is similarly true for already passed targets, which may instead yield a negative Doppler speed $v_D<0$. As a result, equation 1.4 below can be extracted from equation 3 above to yield a reprojection angle of a target.

$$\alpha = \arccos\left(\frac{v_D}{v_R}\right) \quad (4)$$

In one example, a radar sensor may be sensitive to targets on both sides of a path of motion, such as in the case of a forward-facing mounted radar sensor as depicted by FIG. 1B. In FIG. 1B, a scene 120 includes a robot 132 with a radar sensor 121 facing forward along a path of motion of robot 132. Target 124 is resolvable according to equation 1 above because $\alpha=0$. However, targets 122 and 126 are ambiguous because they are respectively located at angles $\alpha$ and $-\alpha$ and, according to equation 3 above, will result in the same Doppler speed. As such, the result is ambiguous.

However, the ambiguity can be resolved by tracking targets while changing the direction of movement of the radar sensor. This is depicted by FIG. 1C in scene 150. Robot 152 with radar sensor 151 detects an ambiguous result (e.g., at respective angles $\alpha$ and $-\alpha$) for target 154 and target 156 while at position 155A. At position 155B, robot 152 has adjusted its bearing by $\beta$ and so target 156 and target 154 each appear at respective angles $\alpha+\beta$ and $\alpha-\beta$. Accordingly, Doppler speed for target 156 can be calculated by $v_D = v_R \cos(\alpha+\beta)$ and Doppler speed for target 154 can be calculated by $v_D = v_R \cos(\alpha-\beta)$.

In another example, the ambiguous result can be resolved by using direction of arrival (DOA) information. The DOA information can be determined by a radar sensor including two or more receiving antennae separated by half a wavelength or less. In particular, a DOA of a target may indicate upon which side it is being passed (e.g., by a sensing radar sensor). For example, if a target is passing the radar sensor on the left, such as target 122 in FIG. 1B, then a DOA for the target gradually shifts towards left. Likewise, if a target is passing the radar sensor on the right, such as target 126 in FIG. 1B, then a DOA for the target gradually shifts rightwards.

Further, the above can be generalized in a three dimensional geometry (e.g., for a robot traversing a substantially three-dimensional scene such as a drone, plane, etc.). As depicted by FIG. 2, three or more receiving antennae 202-206 in a non-collinear arrangement 200 can determine a two-dimensional DOA estimation.

Figure 3:
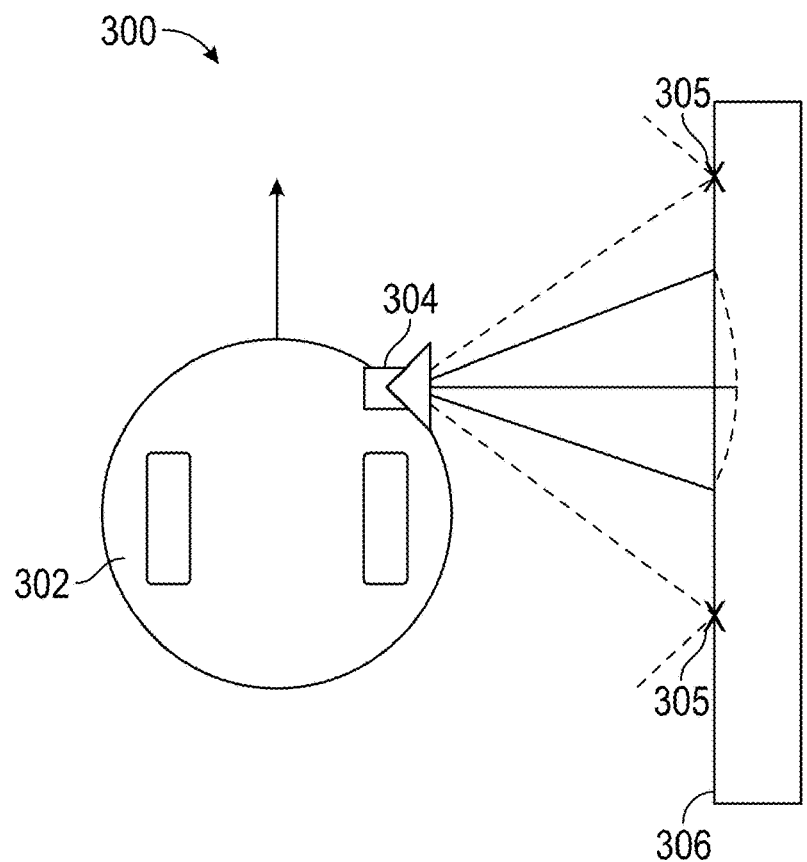
FIG. 3 depicts an example operating environment for detecting a continuous surface, according to various embodiments of the subject technology.

In effect, a horizontal DOA estimation can be determined from a phase difference between receiving antenna 202 and receiving antenna 206. At the same time, a vertical DOA estimation from a phase difference between antenna 202 and antenna 204. These DOA estimations can be respectively performed as discussed above. In the case where a single-point estimation cannot be immediately resolved, a target-tracking-during-change-of-motion-vector approach, as discussed above, may also be utilized.

Where targets may be inadequately represented by a point target (for example a wall). In such a scenario, however, a series of point targets can be generated and a continuous object can be derived based on the series. As depicted by FIG. 3, scene 300 includes a robot 302 with a radar sensor 304. Using the methods discussed above, robot 302 detects a series of point targets 305. Point targets 305 may appear to have a Doppler speed equal to a motion component of radar sensor 304 orthogonal to wall 306 upon which the series of point target 305 are located.

The disclosure now turns to a discussion of configuration and analytic methods for updating a map using radar reprojection as described above.

A radar chirp is used to produce radar echoes (e.g., reflections) received by a radar sensor. Chirp duration, $T_{chirp}$, may be configurable in order to affect raw range profile data. Further, $T_{chirp}$ may be a factor of chirp efficiency, $\eta$, which can influence smoothing of raw range profile data. Chirp efficiency can be defined as a percentage of time spent on actual measurement, as seen in equation 5 below where $n_{chirp}$ is a number of consecutive sweeps, $T_{chirp}$ is a chirp length, and $T_{msg}$ is a time between the start of one respective measurement and a next respective measurement.

$$\eta = \frac{n_{chirp} T_{chirp}}{T_{msg}} \quad (5)$$

Very short chirp duration (e.g., less than 2 milliseconds) may produce low signal to noise ratio (SNR) but incur considerable processing overhead and low chirp efficiency. Short chirp duration (2-5 milliseconds) may have an improved SNR relative to very short chirp durations and, accordingly, a respectively improved efficiency and overhead. Medium duration (5-15 millisecond) chirps may provide a balanced SNR and efficiency. As long duration (15-20 millisecond) and very long duration (greater than 20 millisecond) chirps are approached, processing overhead and likelihood of error (e.g., miscalculations, dropped messages, blurring of target peaks, etc.) greatly increases.

In general, chirp length may impact radar accuracy and resolution. Short chirp times may lead to a higher noise floor, but exhibit less variance (e.g., a narrower band of frequencies), and longer measurement (e.g., chirp) times may have a lower noise floor but more outliers (e.g., greater variance). However, in one example, and as can be seen by FIG. 4, a horn extension can be attached to a radar sensor in order to increase the SNR. In effect, the horn extension focuses the radar beam shape on a smaller field of view.

FIGS. 4A-D depict graphs of range profiles, 402A, 402B, 404A, 404B. FIG. 4A is a normalized echo intensity of range profiles 402A without horn extension. FIG. 4B is a normalized echo intensity of range profiles 404A with horn extension. FIG. 4C is a normalized harmonic mean of range profiles 402B without horn extension. FIG. 4D is a normalized harmonic mean of range profiles 404B with horn extension. FIG. 4C depicts normalized range profiles 402B without a horn extension juxtaposed to graphs of range profiles 404A (FIG. 4B) and respective normalized range profiles 404B (FIG. 4D) with a horn extension. As can be seen, by including a horn attachment, peaks may be more clearly distinguished.

Nevertheless, gathered radar data may be read in as raw data from a radar sensor. The raw data can then be preprocessed, Doppler speeds may be estimated from the preprocessed data, and a radar reprojection map may be constructed based on the estimated Doppler speeds. In some examples, the radar reprojection map may further be overlaid upon or otherwise integrated into (e.g., used to update) a pre-generated map of the respective environment.

Figure 5:
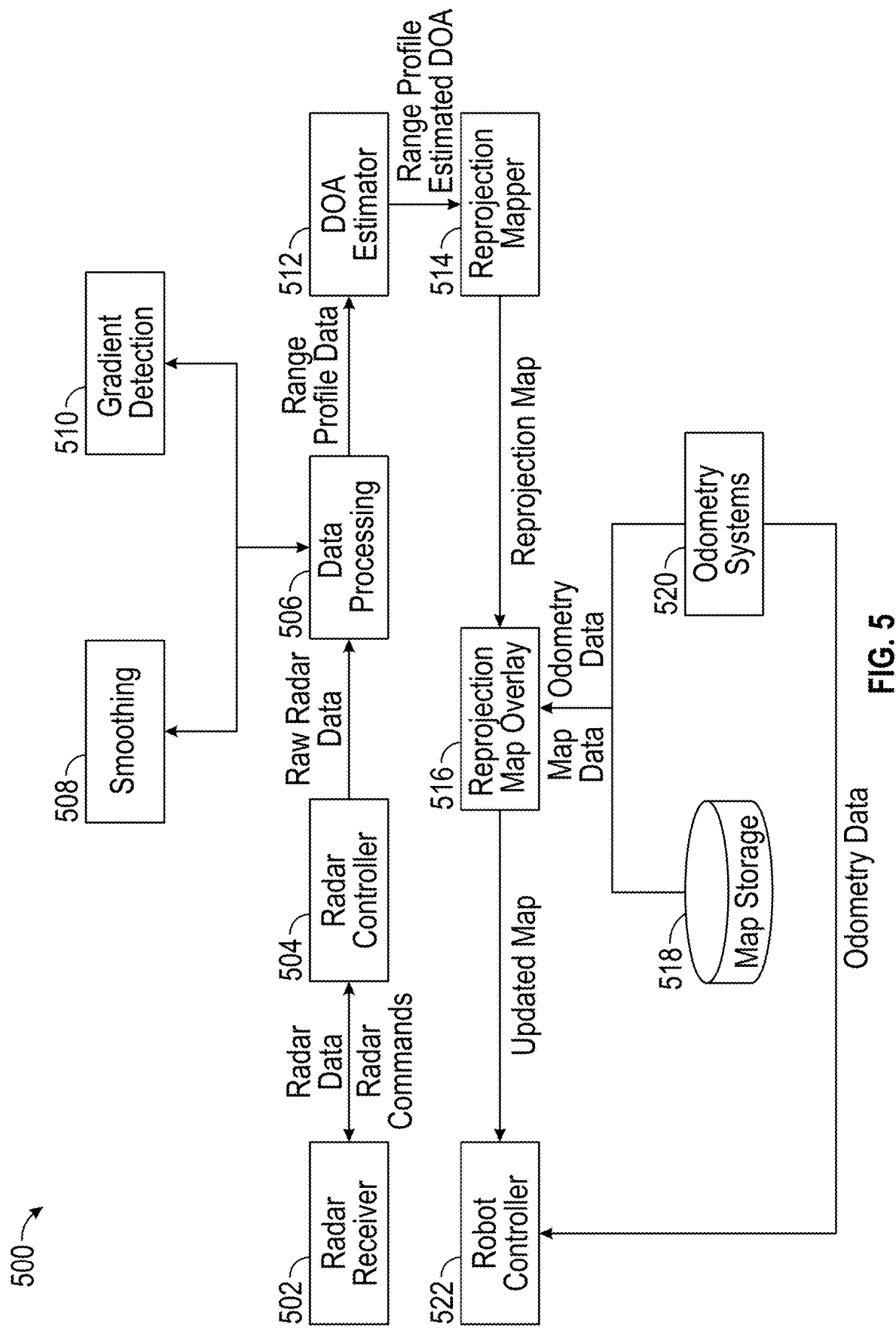
FIG. 5 depicts a system block diagram for radar based mapping in a robot, according to various embodiments of the subject technology.
Figure 6:
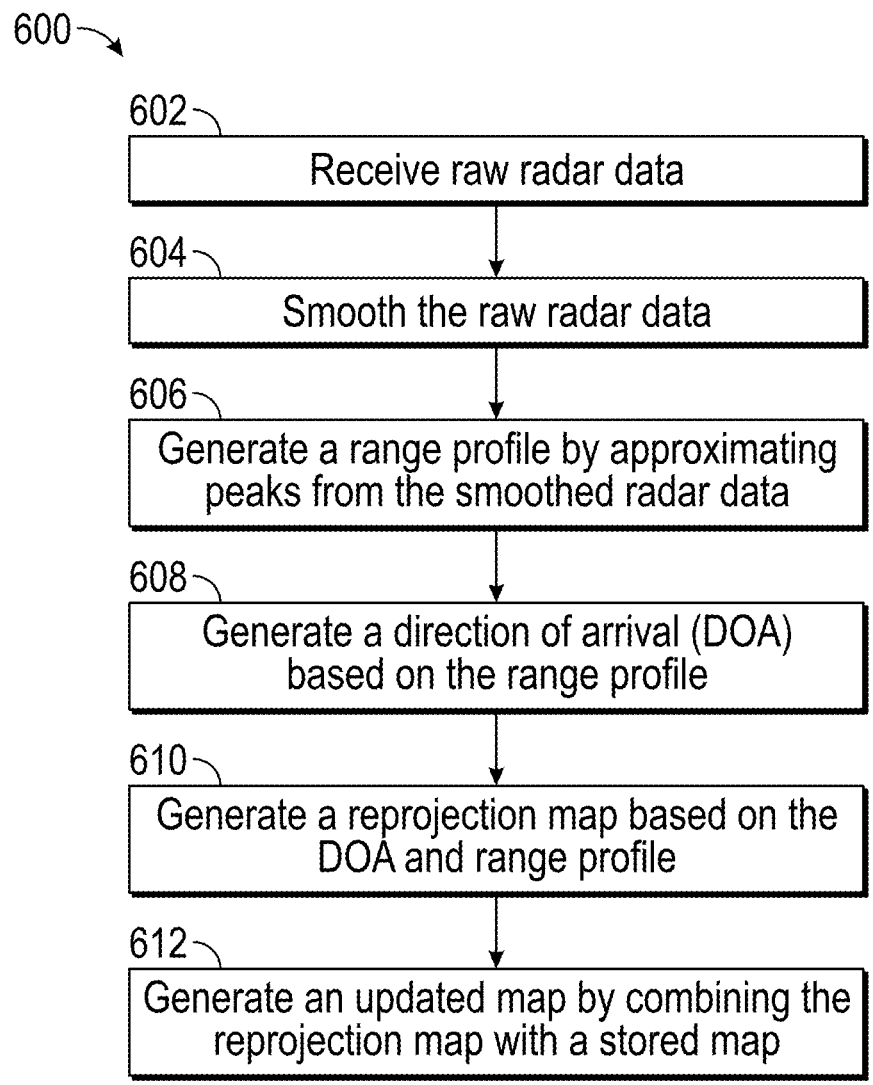
FIG. 6 is a flowchart of an example method for radar based mapping, according to various embodiments of the subject technology.

FIG. 5 and FIG. 6 respectively depict a reprojection mapping system 500 and a reprojection mapping method 600. In some embodiments, reprojection mapping system 500 is integrated into a mobile robot and may be a subsystem. Further, reprojection mapping system 500 can be supported by various other systems and subsystems as will be apparent to a person having ordinary skill in the art.

Radar receiver 502 and radar controller 504 may exchange radar data and radar commands in order to provide input data to radar reprojection mapping system 500. In some examples, radar receiver 502 can include an array of one or more receiver antennae and radar transmitters organized in, for example, a non-collinear configuration and the like as discussed above. In some examples, radar receiver 502 includes a horn for increasing radar quality as discussed above. Further, radar controller 504 may direct radar receiver 502 to perform radar sweeps, frequency, and the like as discussed above by sending, for example, messages including number of sweeps (e.g., n_sweeps) and/or time duration of sweeps (e.g., t_sweep).

Data processing service 506 may receive raw radar data from radar controller 504 and radar receiver 502 (operation 602). Raw radar data may be in the form of a message including packed echo data and/or an EM_Power signal.

Here, data processing service 506 transmits raw radar data to a smoothing service 508 in order to be smoothed via, for example, transforms, kernel applications, and the like (discussed below) in order to produce smoothed data (operation 604). In one example, oversampling may be performed and a moving average over a particular accumulation distance can be used to perform oversampling.

In another example, a binning procedure can smooth the data. Bins may be as wide as an accumulation distance (e.g., distance traveled) of the radar receiver 502 during the respective radar sweep. Samples within each bin may be averaged to represent a respective value of the bin. Various averaging procedures may be used. However, in one embodiment, harmonic mean has been found to provide a good signal quality. Additionally, other values associated with each bin, such as sweep time, position, and cross-range, may also be averaged.

Figure 7:
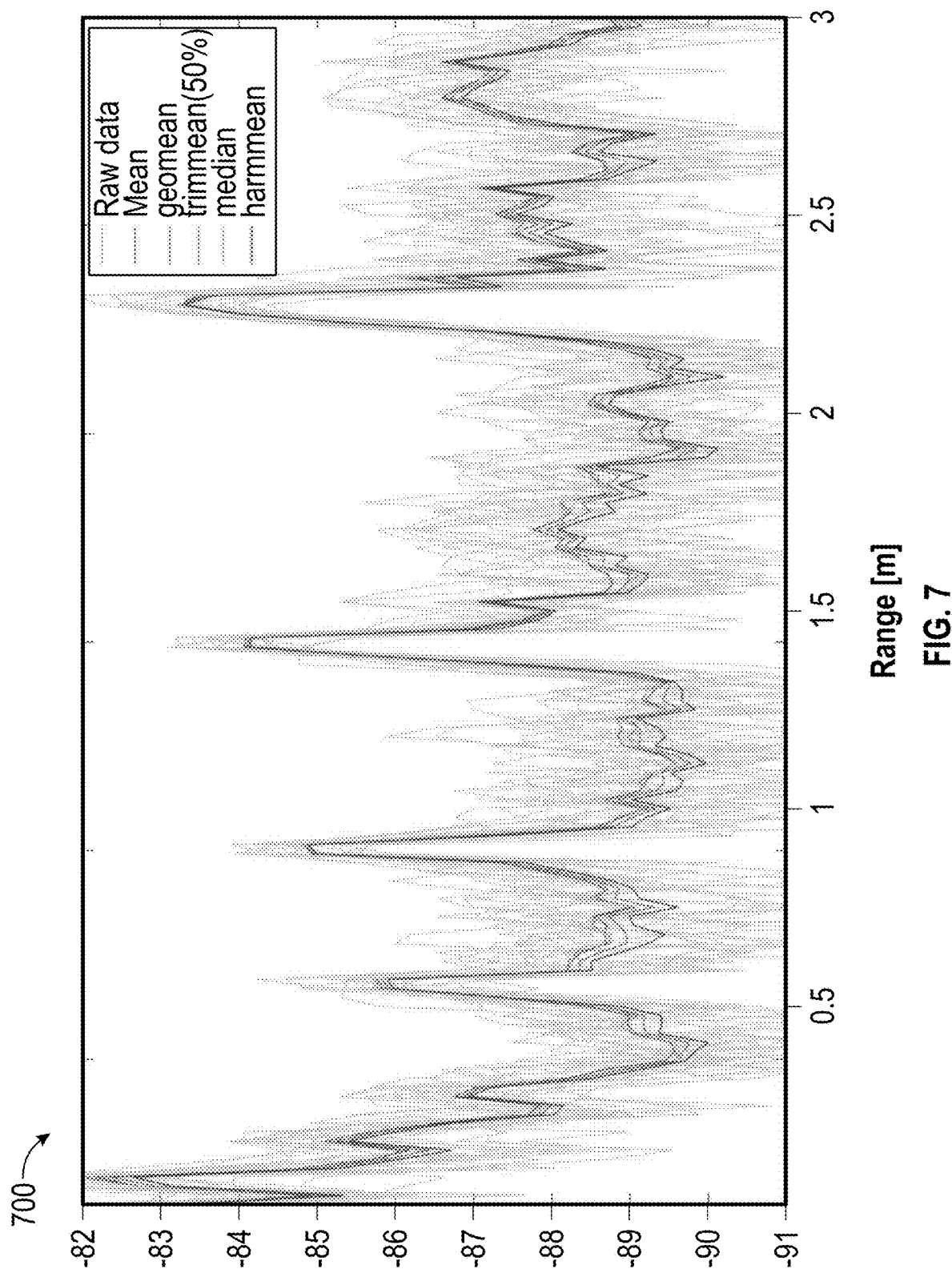
FIG. 7 is a chart comparing different methods for averaging range data, according to various embodiments of the subject technology.

As can be seen in FIG. 7, the harmonic mean has, in some examples, been empirically determined to produce smoothed results. In particular, FIG. 7 depicts comparison graph 700 which shows signal to range plots for raw data, mean, geometric mean ("geomean"), trimmed mean at 50% ("trimmean"), median, and harmonic mean ("harmmean").

Gradient detection service 510 then receives the smoothed data and approximates peaks in order to generate range profiles (operation 606). In particular, gradient detection service 510 may apply a peak gradient process. The peak gradient process can include calculating a Doppler speed through combining graphs with frequency shifts, peak matching, and performing filtering operations such as applying a minimum peak height filter in order to suppress transmit crosstalk (e.g., interference generated by adjacent antennae). In effect, the minimum peak height filter also filters out detected objects within a certain distance (e.g., below a certain peak height).

In some examples, Doppler speed can be estimated from consecutive range profiles (e.g., radar echo intensity versus distance of the echo origin from the sensor, or range, graphs) which are each produced by a "ping" by the radar. The Doppler speed can be derived from a determined change in distance between the radar and a target as discussed above.

In some examples, cross-range mileage may be used to determine the Doppler speed. The Doppler speed may be calculated as a change of distance to the target per cross-range moved (by the sensor). In effect, calculations become time independent and thus independent of radar movement speed and so less prone to computational complications and the like.

In some examples, change in cross-range (e.g., $d_{cross}$) and change in target distance (e.g., "downrange" or $d_{down,i}$) can be used to calculate Doppler speeds as a proportion of the sensing radar speed (e.g., inside mobile robot speed). For example, the equation 6 below may provide a percentage value (e.g., relative to the radar speed) of the sensor.

$$v_{D,1} = \frac{d_{down}}{d_{cross}} \quad (6)$$

In some examples, such as in cases of imprecise target peak localization due to noisy radar data and the like, proportional speeds exceeding 100% may be calculated which is impossible in a static environment.

In some examples, this can be overcome by averaging noisy data. In another example, peak localization can be improved by increasing down range accuracy. The impact of downrange accuracy is generally affected by the SNR, as can be seen in equation 7 below, where dR is a smallest measurable change of target range.

$$\sigma_R = \frac{dR}{\sqrt{SNR}} \qquad (7)$$

In some examples, Doppler speed may be calculated via inter-scan estimation. In inter-scan estimation, data may first be smoothed via oversampling and consecutive sweeps separated into individual scans with, for example, timestamps adjusted to $T_{msg}+i*T_{chirp}$, where $T_{msg}$ is a timestamp of the received data (e.g., from radar controller 504), i is an index for consecutive sweeps, and $T_{chirp}$ is sweep duration.

Figure 8:
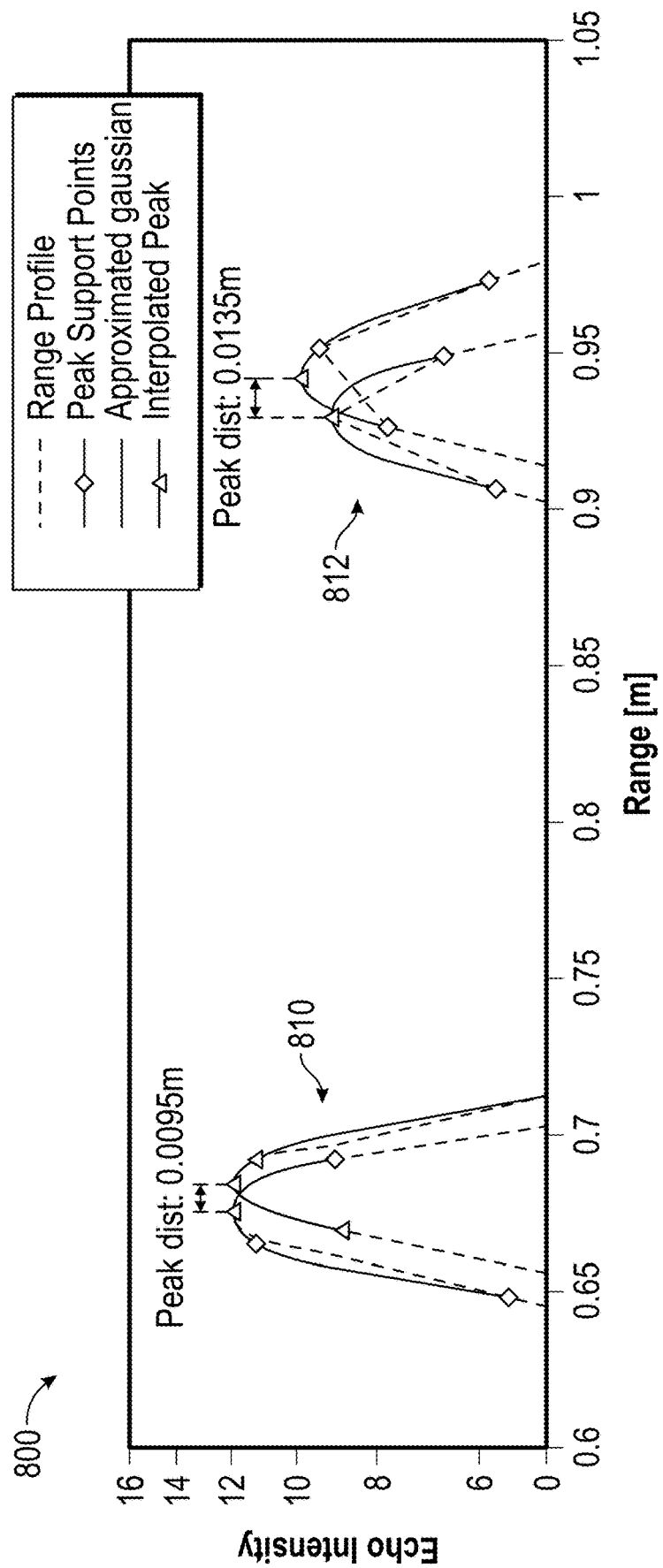
FIG. 8 is a chart of approximated ranges, according to various embodiments of the subject technology.

Subsample peak interpolation may be used to measure peak distance shifts, as depicted in FIG. 8 by chart 800. In particular, a curve is fitted on several supporting points in the received data. In the case of a single, non-overlapping radar echo peak, a Gaussian pulse of the form of equation 8 below may provide peak distance shifts.

$$g_i(x) = a_i e^{-i(x-c_i)^2} \qquad (8)$$

Chart 800 includes a peak distance shift 810 and a peak distance shift 812. Data points of chart 800 are fitted by a Gaussian transform (e.g., such as equation 8 above). As a result, peak distance shift 810 (e.g., $d_{down,1}$) is approximately 0.0095 m or 9.510 mm and peak distance shift 812 (e.g., $d_{down,2}$) is approximately 0.0135 m or −13.52 mm. Using the methods discussed above, Doppler speeds of 48.26% and −68.63% of radar movement speed for peak distance shift 810 and peak distance shift 812 respectively can be calculated. These values are plausible estimations and can be used to calculate a reprojection angle Where range cell migration arcs of multiple targets cross each other, and thus peak-associated data like DOA and Doppler speed are super-positioned as a result, all peaks in respective range scan lines can be sorted by ascending value (e.g., peak height). An average over a full width at half maximum (FWHM) of each respective cell can be assigned to each respective cell. In effect, higher peaks (e.g., stronger radar echoes) are thus treated as more important than lower peaks.

Returning to FIGS. 5 and 6, once data processing service 506 completes smoothing and gradient detection on the raw radar data (e.g., as per the above discussion), the resultant range profile data can be sent to a DOA estimator service 512 for determining a DOA based on the received range profile data (operation 608). DOA angle can be measured, as discussed above, from a phase difference at receiving antennae of a multistatic radar.

Target peaks in a range profile may first be detected. Each peak in each range scan line along with a respective interpolated location, FWHM value, and matching peaks in adjacent lines (e.g., sharing value and/or location) may be recorded.

Down ranges may then be averaged. In each range scan and at every detected target peak, respective phase shifts may be averaged over a width of the respective detected peak. In some examples, a Gaussian fit can be used to weight the average based on subsample peak interpolation.

In each range scan line, each phase shift (e.g., of each peak) can be averaged over a configurable accumulation distance in a cross-range dimension. In some examples, this may be accomplished by taking an arithmetic mean of all phase shifts at all matching peaks within an accumulation distance in a cross-range dimension.

In some examples, noisy values at non-target peak range bins can be removed via, for example, masking. For each scan line, a DOA can then be determined from the smoothed phase shift values. In some examples, equation 2.21 discussed above may be used to calculate the DOA.

DOA estimator service 512 may then send the range profiles and estimated DOA to a reprojection mapper service 514 in order for reprojection mapper service 514 to generate a reprojection map (operation 610). Reprojection mapper service 514 can then send a reprojection map to reprojection map overlay 516 in order to update a stored map (operation 612). In some examples, reprojection mapper service 514 and reprojection map overlay 516 may be a single service receiving, for example, individual range profiles and estimated DOAs as they are generated and in a streaming manner. In some examples, reprojection mapper service 514 can instead collect multiple range profiles and respective estimated DOAs in order to send batch reprojection map data to reprojection map overlay 516.

In either case, reprojection map overlay 516 receives map data from a map storage 518 (e.g., a local memory, etc.) and odometry data from odometry systems 520. Reprojection map overlay 516 sends updated map data to map storage 518 and also to robot controller 522 for navigation purposes and the like. Further, odometry system 520 may continue to exchange odometry data with robot controller 522 for navigation purposes and the like as will be apparent to a person having ordinary skill in the art.

Reprojection mapping of the scan lines can be produced in either of two ways. Based on, for example, odometry data indicating the motion of the scanning sensor, backwards mapping, depicted by FIG. 9 as method 900, or forwards mapping, depicted by FIG. 10 as method 1000, may be utilized. In one sense, backwards mapping performs mapping from a stored map first and relying on radar data as needed, while forwards mapping performs mapping from radar data first and relying on stored map data as needed.

Figure 9:
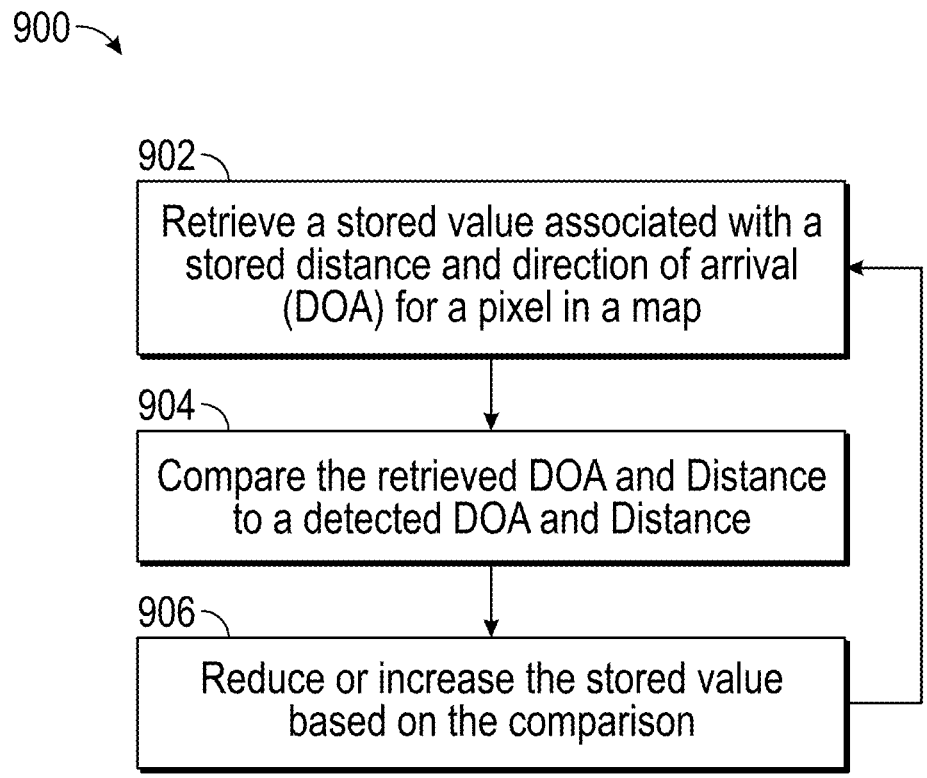
FIG. 9 is a flowchart of an example method for backwards mapping, according to various embodiments of the subject technology.

Referring to backwards mapping method 900 of FIG. 9, backwards mapping may iterate over each pixel in the map. As a result, "negative" information, or removal of information, may be added to the map where a range scan line does not feature a peak at that range (e.g., no object is detected). In other words, each mapped pixel can be checked against an update from the radar. In plain language, the backwards method 900 looks at every grid cell in a map and adjusts a respective value based on radar peaks. The respective value stores information about a likelihood that an obstacle is in that cell. The map already exists (e.g., created by a laser or previous mapping activity, etc.) and may be retrieved from map storage 518. While more computationally expensive relative to forwards mapping, backwards mapping provides for a comprehensive map update. In some examples, backwards mapping is performed at scheduled times using batch data (e.g., to update map storage 518 while a robot is not in operation).

First, a stored value associated with a stored distance and stored DOA for a pixel in a map is retrieved (operation 902). The retrieved DOA and distance are then compared to a detected DOA and distance (operation 904).

The stored value is then increased or decreased based on the comparison (operation 906). In particular, if the retrieved DOA and distance indicate a weaker peak than the detected DOA and distance, the stored value may be reduced (e.g., for the pixel in the map). In some examples, the retrieved DOA and distance may be replaced by the detected DOA and distance as well. In contrast, where a peak is stronger, the stored value may be increased. Backwards mapping method 900 may be repeated until substantially all (or some predetermined threshold portion) of a map is updated.

Figure 10:
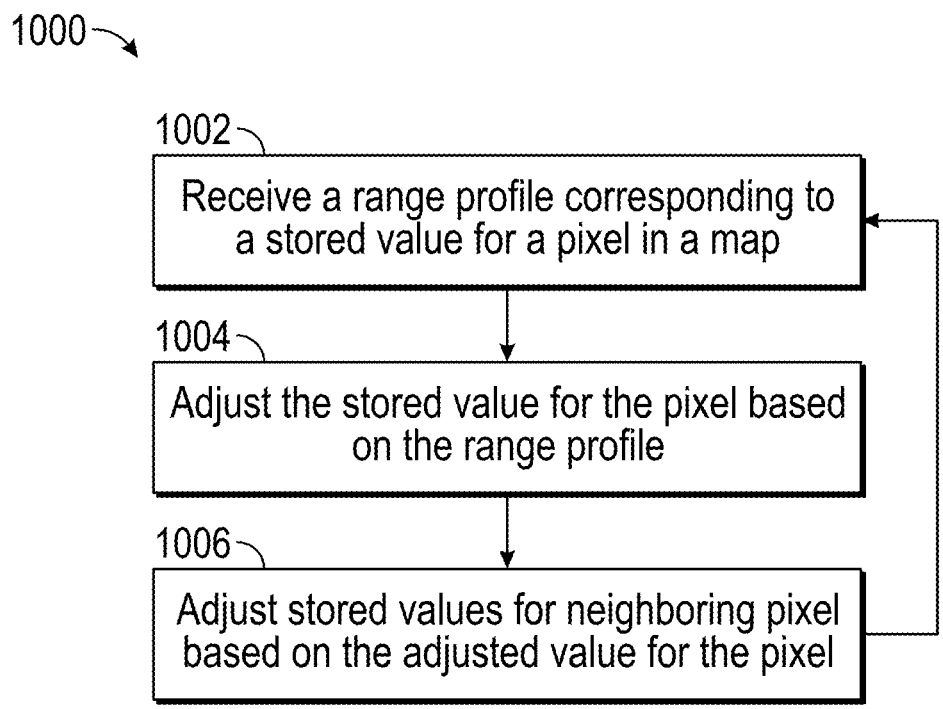
FIG. 10 is a flowchart of an example method for forwards mapping, according to various embodiments of the subject technology.

Turning to FIG. 10, forwards mapping method 1000 may iterate over each range bin in each range scan line. Peaks in a radar profile may be used to additively adjust values of a stored map where respective peaks overlap with the map grid cells. Detected peaks can be reprojected to a position on the map calculated from, for example, Doppler speed, range, and sensor position. Further, sample splitting may be used to distribute a value over nearby pixels.

A range profile corresponding to a stored value for a pixel in a map is first received (operation 1002). The stored value is then adjusted based on the ranged profile (operation 1004). Stored values for neighboring pixels are then adjusted as well (operation 1006). Forwards mapping method 1000 may be repeated for each processed range profile and so, in effect, only updating portions of a map that are encountered during by the radar sensor.

In particular, sample splitting (e.g., operation 1006) may reduce aliasing when projecting pixels via forward mapping method 1000. A sample can be split over four proximate map pixels and the split may be weighted with a distance from nearby pixel centers to target coordinates. While the disclosure refers to splitting samples over four proximate map pixels, it will be understood by a person having ordinary skill in the art that a sample can be split over any number of pixels (e.g., six, eight, nine, etc.).

Figure 11:
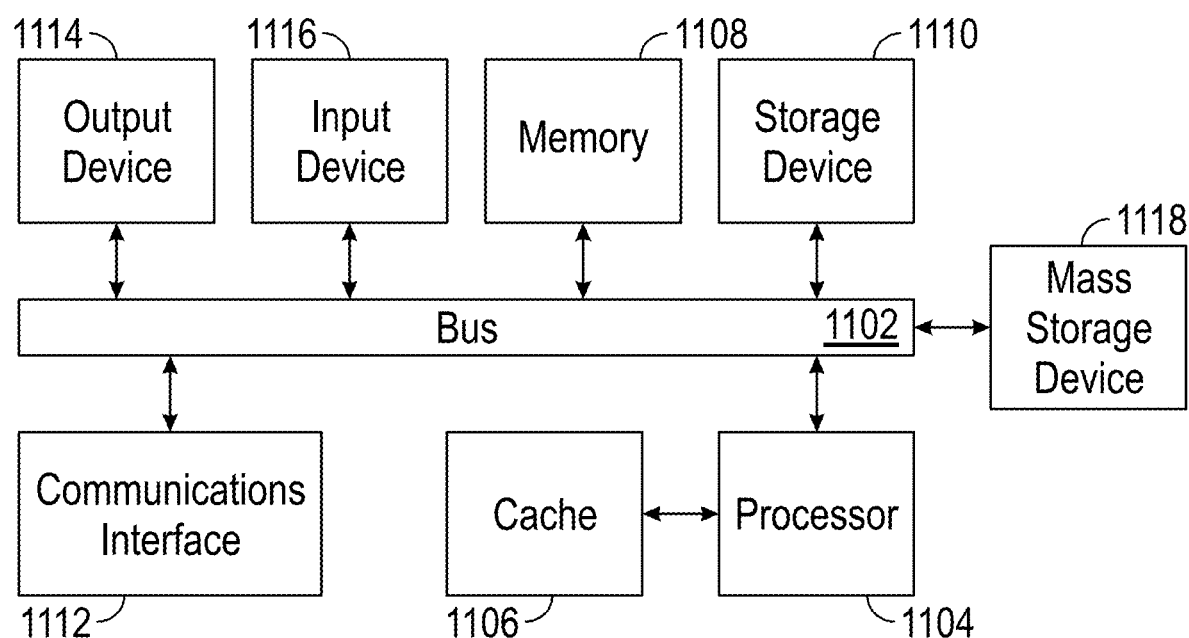
FIG. 11 is a system diagram of an example computing system that may implement various systems and methods discussed herein, in accordance with various embodiments of the subject technology.

FIG. 11 is an example computing system 1100 that may implement various systems and methods discussed herein. The computer system 1100 includes one or more computing components in communication via a bus 1102. In one implementation, the computing system 1100 includes one or more processors 1104. The processor 1104 can include one or more internal levels of cache 1106 and a bus controller or bus interface unit to direct interaction with the bus 1102. The processor 1104 may specifically implement the various methods discussed herein. Main memory 1108 may include one or more memory cards and a control circuit (not depicted), or other forms of removable memory, and may store various software applications including computer executable instructions, that when run on the processor 1104, implement the methods and systems set out herein. Other forms of memory, such as a storage device 1110 and a mass storage device 1118, may also be included and accessible, by the processor (or processors) 1104 via the bus 1102. The storage device 1110 and mass storage device 1118 can each contain any or all of the methods and systems discussed herein.

The computer system 1100 can further include a communications interface 1112 by way of which the computer system 1100 can connect to networks and receive data useful in executing the methods and system set out herein as well as transmitting information to other devices. The computer system 1100 can also include an input device 1120 by which information is input. Input device 1116 can be a scanner, keyboard, and/or other input devices as will be apparent to a person of ordinary skill in the art. An output device 1114 can be a monitor, speaker, and/or other output devices as will be apparent to a person of ordinary skill in the art.

The system set forth in FIG. 11 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. An autonomous device comprising:
    a radar system including a transmitter and two spaced apart receivers spaced apart by half a wavelength or less, wherein the transmitter is configured to produce a radar chirp and each receiver is configured to receive raw radar data corresponding to a reflection of the radar chirp;
    a processor; and
    a memory, storing instructions which when executed by the processor causes the processor to:
        approximate a peak in the respective radar data from each of the spaced apart receivers;
        determine a phase difference between the respective peaks;

determine a Doppler speed associated with the raw radar data;
determine a direction of arrival (DOA) based on the approximated peaks, the phase difference, and the Doppler speed;
generate a reprojection map based on the DOA and the approximated peaks; and
update a map using the reprojection map.

2. The device of claim 1, further comprising instructions which when executed by the processor, causes the processor to smooth the received raw radar data.

3. The device of claim 2, further comprising instructions which when executed by the processor, causes the processor to apply a Gaussian transform to the received raw radar data.

4. The device of claim 1, further comprising instructions which when executed by the processor, causes the processor to:
retrieve a stored value associated with a stored distance, a stored direction of arrival, and a pixel in the map;
detect a direction of arrival and a distance corresponding to the pixel; and
modify the stored value based on a comparison of the stored direction of arrival and the stored distance to the detected direction of arrival and the detected distance.

5. The device of claim 1, further comprising instructions which when executed by the processor, causes the processor to:
receive a range profile, the range profile corresponding to a stored value for a pixel in the map;
modify the stored value for the pixel based at least in part on the received range profile; and
modify a stored value for a neighboring pixel in the map based at least in part on one of the received range profile or the modified value for the pixel.

6. The device of claim 5, further comprising instructions which when executed by the processor, causes the processor to modify the stored value for the neighboring pixel based on a distance between the neighboring pixel and the pixel.

7. The device of claim 1, wherein at least one of the spaced apart receivers includes a horn extension.

8. A system for updating a map, the system comprising:
a radar system including a transmitter and three spaced apart receivers disposed in a non-collinear arrangement, wherein the transmitter is configured to produce a radar chirp and each receiver is configured to receive raw radar data corresponding to a reflection of the radar chirp;
a processor; and
a memory, storing instructions which when executed by the processor causes the processor to:
approximate a peak in the respective radar data from each of the spaced apart receivers;
determine a phase difference between the respective peaks;
determine a Doppler speed associated with the raw radar data;
determine a direction of arrival based on the approximated peaks, the phase difference, and the Doppler speed;
generate a reprojection map based on the DOA and the approximated peaks; and
update a map using the reprojection map;
wherein approximating the peak and determining the phase difference is performed with respect to a selected two of the three receivers.

9. The system of claim 8, further comprising instructions which when executed by the processor, causes the processor to smooth the received raw radar data.

10. The system of claim 9, further comprising instructions which when executed by the processor, causes the processor to apply a Gaussian transform to the received raw radar data.

11. The system of claim 8, further comprising instructions which when executed by the processor, causes the processor to:
retrieve a stored value associated with a stored distance, a stored direction of arrival, and a pixel in the map;
detect a direction of arrival and a distance corresponding to the pixel; and
modify the stored value based on a comparison of the stored direction of arrival and the stored distance to the detected direction of arrival and the detected distance.

12. The system of claim 8, further comprising instructions which when executed by the processor, causes the processor to:
receive a range profile, the range profile corresponding to a stored value for a pixel in the map;
modify the stored value for the pixel based at least in part on the received range profile; and
modify a stored value for a neighboring pixel in the map based at least in part on one of the received range profile or the modified value for the pixel.

13. The system of claim 12, further comprising instructions which when executed by the processor, causes the processor to modify the stored value for the neighboring pixel based on a distance between the neighboring pixel and the pixel.

14. An autonomous device comprising:
a radar system including a transmitter and three spaced apart receivers disposed in a non-collinear arrangement, wherein the transmitter is configured to produce a radar chirp and each receiver is configured to receive raw radar data corresponding to a reflection of the radar chirp;
a processor; and
a memory, storing instructions which when executed by the processor causes the processor to:
approximate a peak in the respective radar data from each of the spaced apart receivers;
determine a phase difference between the respective peaks;
determine a Doppler speed associated with the raw radar data;
determine a direction of arrival (DOA) based on the approximated peaks, the phase difference, and the Doppler speed;
generate a reprojection map based on the DOA and the approximated peaks; and
update a map using the reprojection map;
wherein approximating the peak and determining the phase difference is performed with respect to a selected two of the three receivers.

15. The device of claim 14, further comprising instructions which when executed by the processor, causes the processor to smooth the received raw radar data.

16. The device of claim 15, further comprising instructions which when executed by the processor, causes the processor to apply a Gaussian transform to the received raw radar data.

17. The device of claim 14, further comprising instructions which when executed by the processor, causes the processor to:

retrieve a stored value associated with a stored distance, a stored direction of arrival, and a pixel in the map;

detect a direction of arrival and a distance corresponding to the pixel; and modify the stored value based on a comparison of the stored direction of arrival and the stored distance to the detected direction of arrival and the detected distance.

18. The device of claim 14, further comprising instructions which when executed by the processor, causes the processor to:

receive a range profile, the range profile corresponding to a stored value for a pixel in the map;

modify the stored value for the pixel based at least in part on the received range profile; and modify a stored value for a neighboring pixel in the map based at least in part on one of the received range profile or the modified value for the pixel.

19. The device of claim 18, further comprising instructions which when executed by the processor, causes the processor to modify the stored value for the neighboring pixel based on a distance between the neighboring pixel and the pixel.

20. The device of claim 14, wherein the radar chirp duration is in the range of 5 to 15 milliseconds.

* * * * *